Figure 1:
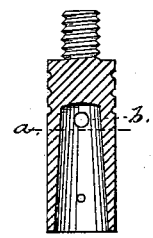
Figure 2:
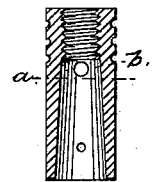
Figure 3:
Figure 4:
Figure 5:
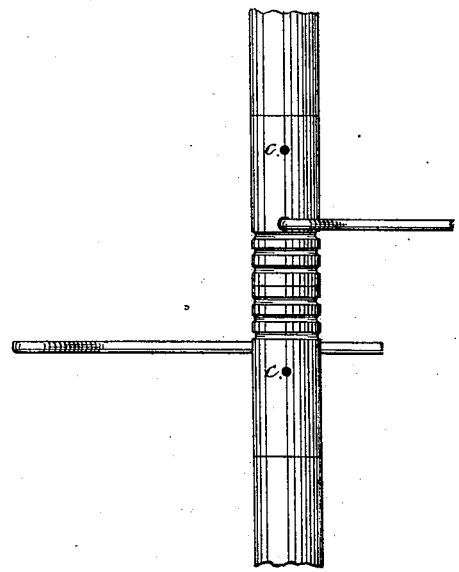

B. L. BUDD.
GUN-CLEANING ROD.

No. 190,189. Patented May 1, 1877.

Witnesses:
F. W. Howard
Sam'l Glover.

Inventor:
Bern L. Budd

UNITED STATES PATENT OFFICE.

BERN L. BUDD, OF FAIRFIELD, CONNECTICUT.

IMPROVEMENT IN GUN-CLEANING RODS.

Specification forming part of Letters Patent No. 190,189, dated May 1, 1877; application filed March 14, 1877.

*To all whom it may concern:*

Be it known that I, BERN L. BUDD, of the town and county of Fairfield, in the State of Connecticut, have invented a new and useful Improvement in Gun-Cleaning Rods, which improvement is fully set forth in the following specification, reference being had to the accompanying drawings.

The object of my invention is to provide a coupling for a gun-cleaning rod, strong, reliable, and easily managed.

Heretofore most, if not all, the couplings in the market have been made by soldering into brass tubing either a screw or a nut, as a male or female coupling might be desired. From this cheap, weak, and imperfect method of construction much annoyance has been occasioned. My couplings, on the contrary, are made from solid drawn metal rod. For instance, if I am manufacturing the male couplings the solid metal rod is placed in a lathe, provided with a hollow spindle, a length of the rod sufficient in quantity to manufacture the coupling is allowed to project, and is held clamped in the head-stock of the lathe by a suitable chuck. A hollow cutter now comes up and sizes the rod. After this a second hollow cutter forms the pin and shoulder for the screw. This is followed in turn by a die, which forms the screw. A side tool now cuts off the length of rod required for the coupling. In a subsequent operation the coupling is chucked in the lathe by means of the screw previously formed on it, and the tapered hole drilled into the other end to receive the wooden rod. In making a female coupling the operation is much the same, except that the tools are reversed. For instance, a drill is used instead of a hollow cutter, and a tap instead of a die.

By this method a solid, firm, and reliable coupling is made, which is not liable to be bent or broken, and which may at all times be depended upon to perform the duty required of it.

Figure I represents a section of the male, and Fig. II a section of the female, coupling. Fig. III shows the end of one of the joints of the wooden rod.

It will be observed that the holes drilled into the end of the couplings to receive the wooden rod are tapered, and that the wood is turned to a corresponding taper, and fills accurately the tapered bore in the coupling, so far as diameter is concerned; but when the length is noticed it will be observed that the wooden rod is somewhat shorter than the depth of the tapered hole in the coupling, and fills it only to the extent represented in the drawing by the line *a*. This leaves, then, a space between the end of the wooden rod, and the bottom of the tapered hole in the coupling.

It will be further seen that just above the bottom of the tapered hole in the coupling there is a small hole running through the coupling at right angles with the screw, as shown in the drawing at *b*. The object of this hole is to facilitate the screwing up or the unscrewing of the jointed rod. Almost everybody who has ever used one of the cleaning-rods in ordinary use has, at times, been perplexed at the difficulty experienced in unscrewing the joints. Particularly is this so if the hands chance to be wet or greasy, which is ordinarily the case when cleaning a gun.

With my perforated coupling this annoyance is done away with, for, by means of a simple wire wrench, of a shape such as shown at Fig. IV, the inner surface of the bend of which corresponds to the diameter of the coupling, or by means of the other—that is, the straight—end of the same wire wrench, or by means of a simple straight piece of wire, the coupling, when obstinately fast, may be readily and effectually loosened and unscrewed.

Fig. V shows a male and female coupling screwed together, and the wrench in position in either of the ways I have indicated they could be used. With these there is no longer any difficulty. The rods are easily separated, and there is no delay occasioned.

I am aware that other devices may be used to answer the same purpose. Thus, for instance, I have made the hole for the wrench of different shapes, but find a round one preferable, from the fact that it is so much more easily made.

I fasten the coupling to the rods first with a cement composed of shellac and Venice turpentine, and afterward fasten them more securely by running two pins entirely through the coupling and rod. These pins are shown at $c$ in Fig. V.

In order that the matching-joints may be recognized at once, no matter in what position they lie, I form circumferential grooves or rings upon them, which vary in number with the different joints, but correspond upon the matching parts. For instance, one joint may be marked by a single groove upon each mating part, the next by two grooves, and the third by three.

In the drawing, I have shown only one pair of coupling parts, and these with three grooves upon each.

It is apparent that with these grooves encircling the parts the joints cannot be turned into such a position, as even momentarily to hide the identifying marks, and therefore no time will be lost in searching for the matching ends.

Having thus described my invention, what I claim as new, and desire to secure by Letters Patent, is—

1. A gun-cleaning rod made in parts, each part bearing a male or female screw coupling, riveted thereto, and having an aperture, $c$, extending through the coupling between the end of the rod and the bottom of the tapered hole in the coupling, substantially as described.

2. A gun-cleaning rod-coupling, having the perforations $c$ for rivets or pins, and a perforation, $b$, for a wrench, substantially as and for the purpose set forth.

3. A jointed gun-cleaning rod, which has upon the surface of the couplings circumferential grooves or rings, which vary and correspond in number at and designate the mating-joints, substantially as and for the purpose described.

BERN L. BUDD.

Witnesses:
   SAML. GLOVER,
   F. W. HOWARD.